United States Patent Office 3,128,285
Patented Apr. 7, 1964

3,128,285
17-(HYDROCARBON-SUBSTITUTED)-4-OXA-5α-ANDROSTAN-17β-OLS
Norman W. Atwater, Arlington Heights, Ill., assignor to G. D. Searle & Co., Chicago, Ill., a corporation of Delaware
No Drawing. Filed Sept. 25, 1962, Ser. No. 226,168
8 Claims. (Cl. 260—345.2)

The present invention pertains to novel steroid-like organic compounds characterized by an oxygen-containing heterocyclic ring structure, and, more particularly, to 4-oxa-5α-androstan-17β-ols substituted at the 17-position also by an aliphatic hydrocarbon group, as is represented by the structural formula

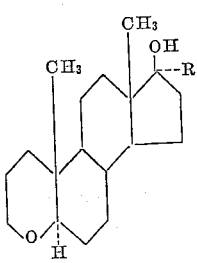

wherein R is a lower hydrocarbon radical.
Examples of the lower hydrocarbon radicals represented by R are alkyl, alkenyl, and alkynyl radicals such as methyl, ethyl, propyl, butyl, pentyl, hexyl, vinyl, propenyl, butenyl, pentenyl, hexenyl, ethynyl, propynyl, butynyl, pentynyl, hexynyl, and the branched-chain isomers thereof.

The compounds of the present invention are conveniently manufactured by utilizing as the starting material, 4-oxa-5α-androstan-17-one. The reaction of that substance with an aliphatic organo-metallic reagent affords the 17-(hydrocarbon-substituted)-17β-ols of this invention. Typically, 4-oxa-5α-androstan-17-one in tetrahydrofuran is allowed to react with ethereal methyl magnesium bromide, and the resulting adduct is hydrolyzed with water to afford 17α-methyl-4-oxa-5α-androstan-17β-ol. The reaction of that starting material with a lower alkyne in the presence of a suitable alkaline catalyst, on the other hand, produces the 17α-(lower alkynyl)-17β-ols of this invention. When the lower alkyne is acetylene and the alkaline catalyst is potassium hydroxide, for example, 17α-ethynyl-4-oxa-5α-androstan-17β-ol results.

The 17α-(lower alkenyl) compounds of this invention can be obtained by partial reduction of the corresponding 17α-(lower alkynyl) compounds. As a specific example of the process involved, the aforementioned 17α-ethynyl-4-oxa-5α-androstan-17β-ol in pyridine is shaken with hydrogen in the presence of a 5% palladium-on-calcium carbonate catalyst to yield 17α-vinyl-4-oxa-5α-androstan-17β-ol.

An alternate process for the production of the instant 17α-(lower alkyl)-17β-ols, wherein the alkyl group contains more than one carbon atom, involves the catalytic hydrogenation of the aforementioned 17α-alkynyl or 17α-alkyl compounds. A dioxane solution of 17α-ethynyl-4-oxa-5α-androstan-17β-ol, for example, is shaken in a hydrogen atmosphere with a 5% palladium-on-carbon catalyst to afford 17α-ethyl-4-oxa-5α-androstan-17β-ol.

The compounds of this invention display valuable pharmacological properties. They are hormonal agents, for example, in view of their ability to produce the physiological effects typical of androgens.

The invention will appear more fully from the examples which follow. These examples are given by way of illustration only, and it will be understood that the invention is not to be construed as limited in spirit or in scope by the details contained therein as many modifications in materials and methods will be apparent from this disclosure to those skilled in the art. In these examples, temperatures are given in degrees centigrade (° C.). Quantities of materials are expressed in parts by weight unless otherwise noted.

Example 1

To a solution of 2 parts of 4-oxa-5α-androstan-17-one in 40 parts of tetrahydrofuran is added 15 parts by volume of a 3 molar ethereal methyl magnesium bromide solution, and the resulting mixture is distilled until about 15 parts by volume of distillate are collected. The resulting reaction mixture is heated at the reflux temperature for about 4 hours, then is cooled and diluted carefully with water in order to destroy the excess Grignard reagent. An additional 200 parts of water are then added and the two layers are separated. The aqueous layer is extracted with ether, and this extract is combined with the original organic solution. The combined solutions are dried over anhydrous sodium sulfate and distilled to dryness at reduced pressure. Recrystallization of the resulting residue from acetone affords pure 17α-methyl-4-oxa-5α-androstan-17β-ol, melting at about 199–201°. It is represented by the structural formula

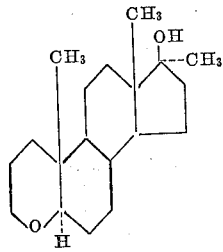

Example 2

Into a slurry of 54 parts of finely divided potassium hydroxide in 285 parts of diethylene glycol dimethyl ether containing 15 parts of diethylene glycol monoethyl ether is bubbled gaseous acetylene, at −10°, until the mixture becomes saturated. To that mixture is then added a solution of 10 parts of 4-oxa-5α-androstan-17-one in 47.5 parts of diethylene glycol dimethyl ether while the introduction of acetylene is continued and the mixture is allowed to warm to room temperature. After the reaction has been allowed to proceed for about 2 hours, the mixture is poured into water, and the resulting precipitate is collected by filtration to yield the crude product. Recrystallization from ethyl acetate affords pure 17α-ethynyl-4-oxa-5α-androstan-17β-ol, melting at about 269–271° and characterized further by the structural formula

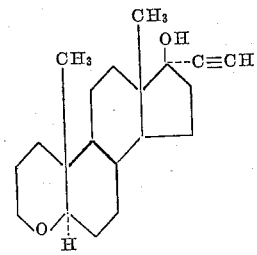

Example 3

The substitution of an equivalent quantity of propyne in the procedure of Example 2 results in 17α-propynyl-4- oxa-5α-androstan-17β-ol, characterized by the structural formula

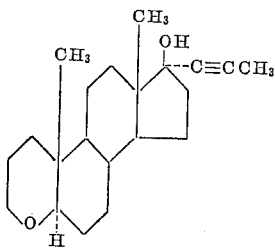

Example 4

To a solution of 5 parts of 17α-ethynyl-4-oxa-5α-androstan-17β-ol in 200 parts of pyridine is added one part of 5% palladium-on-calcium carbonate catalyst, and this mixture is shaken in a hydrogen atmosphere at one atmosphere pressure until one molecular equivalent of hydrogen is absorbed. The catalyst is removed by filtration, and the filtrate is evaporated to dryness at reduced pressure. Recrystallization of the resulting residue from acetone affords 17α-vinyl - 4 - oxa - 5α - androstan-17β-ol, melting at about 179–180°. This substance is represented by the structural formula

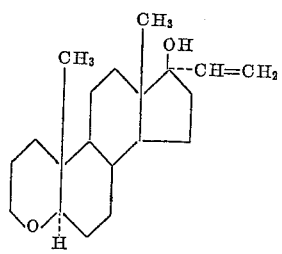

Example 5

By substituting 5.23 parts of 17α-propynyl-4-oxa-5α-androstan-17β-ol and otherwise proceeding according to the processes described in Example 4, 17α-propenyl-4-oxa-5α-androstan-17β-ol of the structural formula

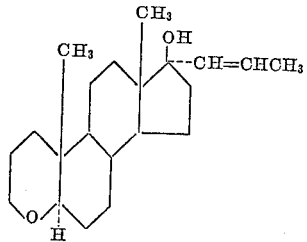

is obtained.

Example 6

To a solution of 3 parts of 17α-ethynyl-4-oxa-5α-androstan-17β-ol in 500 parts of dioxane is added 0.5 part of a 5% palladium-on-carbon catalyst, and this mixture is shaken with hydrogen at one atmosphere pressure until two molecular equivalents of hydrogen are absorbed. Removal of the catalyst by filtration affords a filtrate which is concentrated to dryness by distillation at reduced pressure. Recrystallization of the resulting residue from acetone affords 17α-ethyl - 4 - oxa - 5α - androstan-17β-ol, melting at about 157–158°. This compound is represented by the structural formula

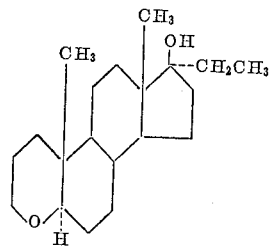

What is claimed is:
1. A compound of the structural formula

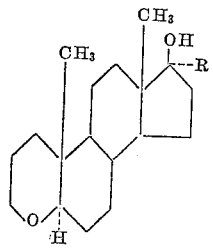

wherein R is selected from the group of radicals consisting of lower alkyl, lower alkenyl, and lower alkynyl.
2. A compound of the structural formula

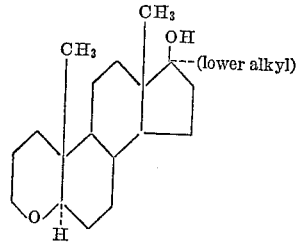

3. 17α-methyl-4-oxa-5α-androstan-17β-ol.
4. 17α-ethyl-4-oxa-5α-androstan-17β-ol.
5. A compound of the structural formula

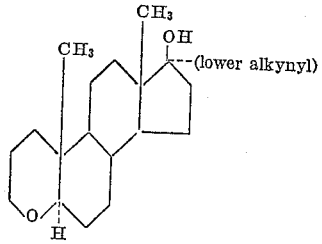

6. 17α-ethynyl-4-oxa-5α-androstan-17β-ol.
7. A compound of the structural formula

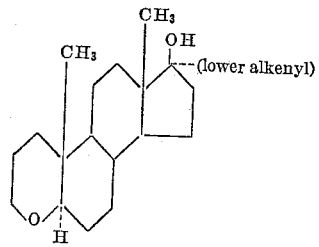

8. 17α-vinyl-4-oxa-5α-androstan-17β-ol.

No references cited.